(12) United States Patent
Robinet et al.

(10) Patent No.: US 7,082,920 B2
(45) Date of Patent: Aug. 1, 2006

(54) PRECOMBUSTION CHAMBER IGNITION DEVICE FOR AN INTERNAL COMBUSTION ENGINE, PRECOMBUSTION CHAMBER IGNITER AND IGNITION METHOD

(75) Inventors: Cyril Robinet, Igny (FR); Nicolas Tourteaux, Rueil Malmaison (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/531,585

(22) PCT Filed: Oct. 17, 2003

(86) PCT No.: PCT/FR03/03082

§ 371 (c)(1),
(2), (4) Date: Apr. 18, 2005

(87) PCT Pub. No.: WO2004/036013

PCT Pub. Date: Apr. 29, 2004

(65) Prior Publication Data

US 2006/0005803 A1    Jan. 12, 2006

(30) Foreign Application Priority Data

Oct. 18, 2002  (FR)  .................................. 02 13021

(51) Int. Cl.
*F02B 19/18*  (2006.01)

(52) U.S. Cl. ...................... 123/260; 123/267; 123/286; 123/292

(58) Field of Classification Search ......... 123/253–293
See application file for complete search history.

(56) References Cited

U.S. PATENT DOCUMENTS

| 4,924,829 | A | * | 5/1990 | Cheng et al. ................ 123/286 |
| 4,926,818 | A |   | 5/1990 | Oppenheim et al. |
| 4,987,868 | A |   | 1/1991 | Richardson |
| 5,105,780 | A |   | 4/1992 | Richardson |
| 5,465,695 | A | * | 11/1995 | Yamamoto et al. .......... 123/256 |
| 5,522,357 | A | * | 6/1996 | Nogi et al. .................. 123/261 |
| 5,947,076 | A |   | 9/1999 | Hiltner et al. |
| 6,065,441 | A | * | 5/2000 | Regueiro ..................... 123/286 |
| 6,073,605 | A | * | 6/2000 | Matsuoka et al. ........... 123/292 |

FOREIGN PATENT DOCUMENTS

| FR | 2 193 417 | 2/1974 |
| FR | 2 781 840 | 2/2000 |
| FR | 2 810 692 | 12/2001 |

\* cited by examiner

*Primary Examiner*—Erick R. Solis
(74) *Attorney, Agent, or Firm*—Nicolas E. Seckel

(57) ABSTRACT

The invention concerns an ignition device for internal combustion engine comprising:
a main combustion chamber (1) fitted with a compression system; and
an igniter (11) comprising a precombustion chamber (2) and an ignition system (13, 14), the precombustion chamber being defined by a precombustion chamber body (12) having a head (12*a*) including passageways (15), the head (12*a*) of the precombustion chamber body (12) separating the precombustion chamber (2) from the main chamber (1) and communicating the precombustion chamber (2) and the main chamber (1) through the passageways (15), characterized in that the passageways comprise at least one passageway enabling the propagation of a flame front of the precombustion chamber (2) to the main chamber (1) when the engine operates on low load and at least one passageway not enabling the propagation of a flame front while enabling the passageway of unstable compounds of the precombustion chamber (2) to the main chamber (1).

28 Claims, 3 Drawing Sheets

Figure 3A:
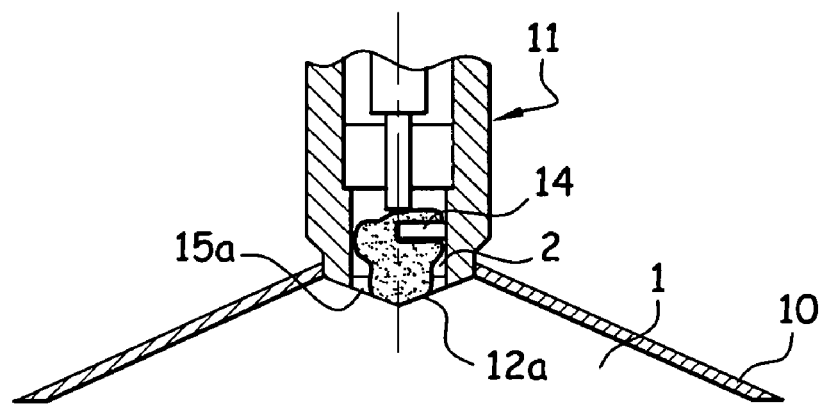

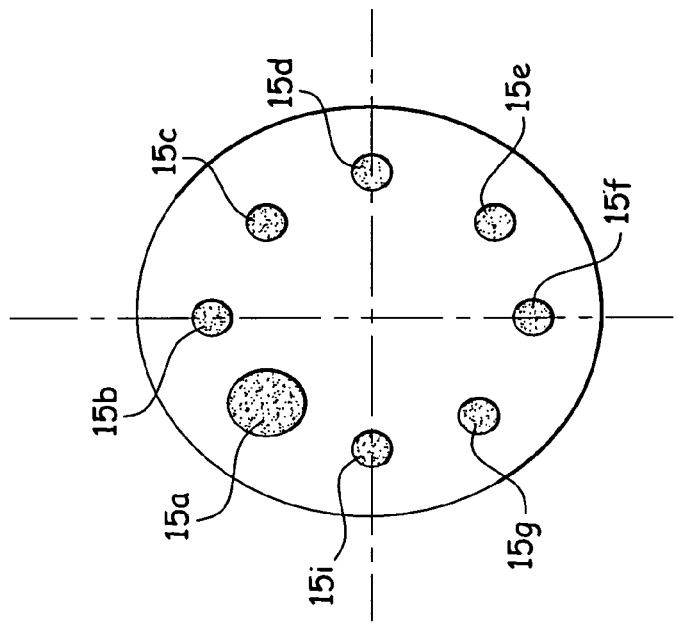
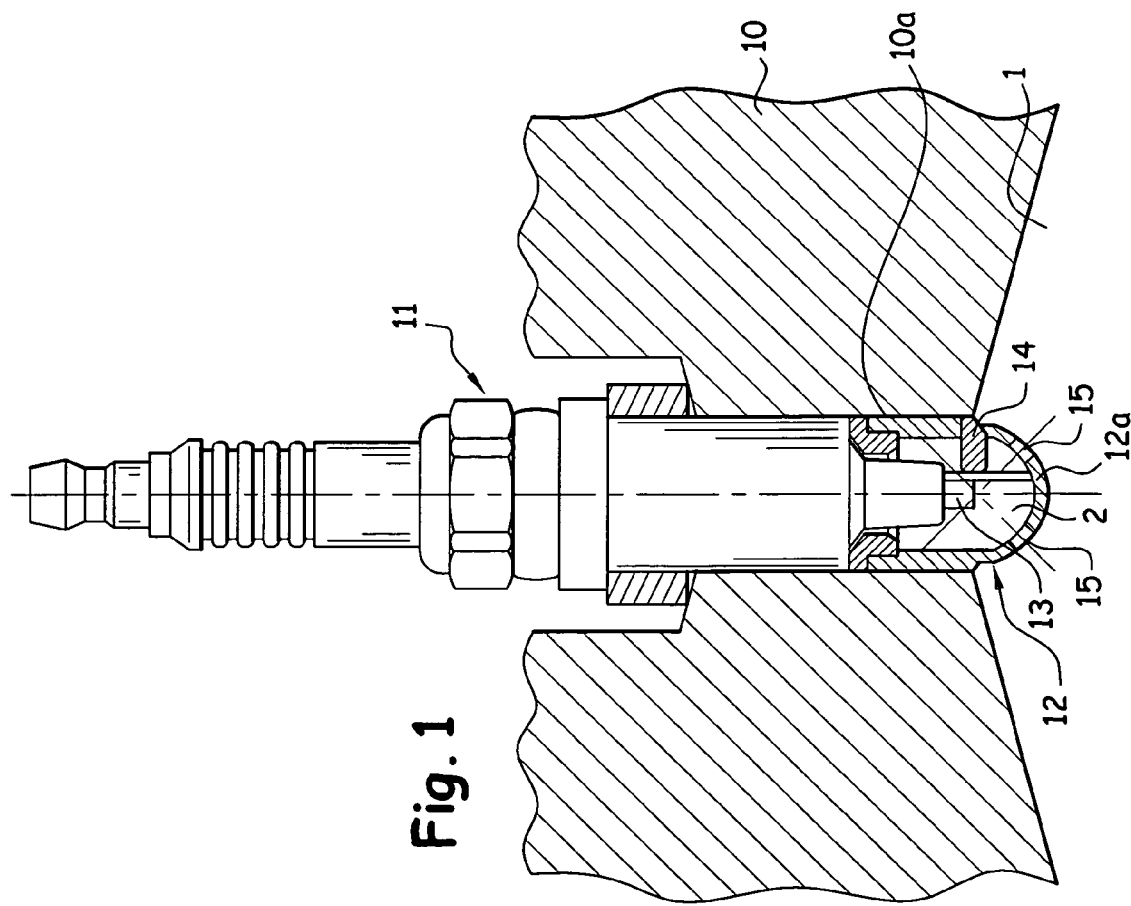

PRECOMBUSTION CHAMBER IGNITION DEVICE FOR AN INTERNAL COMBUSTION ENGINE, PRECOMBUSTION CHAMBER IGNITER AND IGNITION METHOD

The present invention concerns generally an ignition device with precombustion chamber for internal combustion engine which provides a compromise between the combustion efficiency on low load and the combustion efficiency on high load, an ignition method of an internal combustion engine and an igniter with precombustion chamber.

The ignition device according to the invention comprises an igniter with precombustion chamber which may be screwed instead of a conventional sparking plug without any modification of the cylinder head of the internal combustion engine (diameter≦14 mm) and which differs from the conventional plug, among others, in that the means for igniting a mixture of oxidant and fuel are contained in a precombustion chamber defined by a body whereof the head is provided with passageways.

Thus, when the igniter with precombustion chamber is mounted in the cylinder head of the engine, the precombustion chamber of the igniter is separated from the main combustion chamber of the engine by the head of the precombustion chamber body and communicates with the main combustion chamber through the passageways arranged in said head.

The igniter with precombustion chamber may possibly be fitted with means enabling to introduce or to form directly a combustible mixture in the precombustion chamber.

In the document U.S. Pat. No. 4,926,818, there is described a method and a device for the generation of pulsed jets intended to form swirling combustion pockets. The device described comprises a main chamber containing a main combustible mixture and wherein moves a piston and a precombustion chamber receiving reactants and communicating with the main chamber by orifices provided in a wall. The ignition of the reactants in the precombustion chamber generates gas jets in combustion, which ignite the main mixture contained in the main load contained in the main chamber by convection of the flame front.

The patent application FR 2.781.840 concerns an ignition device for an internal combustion engine, comprising:

a main chamber intended for containing a main combustible mixture and fitted with a compression system of said mixture;

a precombustion chamber intended for receiving reactants, said precombustion chamber communicating with the main chamber through at least one passageway, and a system for igniting the reactants contained in the precombustion chamber.

The passageways between the precombustion chamber and the main chamber prevent a flame front from passing through while letting through unstable compounds from the combustion of the reactants contained in the precombustion chamber. The compression system of the main chamber and the seeding of the main mixture with unstable compounds enable mass self-ignition of the main mixture.

Thus, contrary to the conventional controlled ignition engine or to the engine described in the patent U.S. Pat. No. 4,926,818, the ignition of the main mixture is not obtained by the propagation of a flame front, but by the seeding and the compression of the main mixture of the engine.

The self-ignition in a large volume enables very rapid pressure rise, low pinking and good repeatability.

The patent application FR 2.810.692 also concerns an ignition device of an internal combustion engine including a precombustion chamber generally cylindrical in shape, analogous to that described in the application FR 2.781.840, but whereof the passageways communicating with the main combustion chamber are circumscribed by a circular curve going through the centres of the outermost passageways, the diameter of said circular curve being in a ratio smaller than or equal to ½, preferably smaller than or equal to ⅓, with the inner diameter of the cylindrical precombustion chamber. Said disposition enables the operation of the engine with a small quantity of oxidising air, in particular when the composition of the air-fuel mixture in the main chamber is stoichiometric, for depollution reasons with a three-way catalyst.

If the use of igniters with precombustion chamber preventing the propagation of a flame front in the main combustion chamber proves efficient to avoid the pinking phenomenon for high load operation of the engine, one may observe unstable combustion of the engine for a low load operation, notably during idle operation of the engine.

In the present invention, by low load operation of the engine is meant the operating range of the engine from idle to a quarter of the full load of the engine, preferably the range from idle to 10% of the full load in the case of an atmospheric engine and the range from idle to 5% of the full load in the case of a heavily supercharged engine.

The present invention therefore intends to provide an ignition device with precombustion chamber for internal combustion engine remedying the above shortcomings, in particular ensuring the best compromise of operation of the engine on low and high loads.

The invention still relates to an ignition method of an internal combustion engine wherein the ignition of the oxidant-fuel main mixture in a main combustion chamber of the engine is obtained by the propagation of a flame front when the engine operates on low load and by seeding the main mixture with unstable compounds and mass self-ignition of the main mixture when the engine operates on high load.

The above purposes are met according to the invention by an ignition device for internal combustion engine comprising:

a main chamber intended for containing a main combustible mixture and fitted with a compression system of said mixture; and an igniter comprising a precombustion chamber intended for containing a combustible mixture and an ignition system of the combustible mixture contained in the precombustion chamber, the precombustion chamber being defined by a precombustion chamber body having a head including passageways, the head of the precombustion chamber body separating the precombustion chamber from the main chamber and communicating the precombustion chamber and the main chamber through the passageways, characterised in that the passageways comprise at least one passageway enabling the propagation of a flame front from the precombustion chamber to the main chamber when the engine operates on low load and at least one passageway not enabling the propagation of a flame front from the precombustion chamber to the main chamber while enabling the passageway from the precombustion chamber to the main chamber of unstable compounds derived from the combustion of the combustible mixture in the precombustion chamber.

Generally, the number of passageways enabling the propagation of a flame front provided in the head of the precombustion chamber body varies from 1 to 5 and preferably is 1, however that the number of passageways not enabling the propagation of a flame front varies from 1 to 20, preferably from 3 to 15.

Preferably, the number of conduits of diameter smaller than 1 mm is greater than the number of conduits of diameter greater than 1 mm.

Preferably, the passageways are cylindrical passageways.

Preferably, the passageways enabling the propagation of a flame front have a diameter greater than 1 mm and up to 3 mm, better up to 1.5 mm and the passageways not enabling the propagation of a flame front have a diameter equal to or smaller than 1 mm, better from 0.5 to 1 mm.

Obviously, the number and the dimension of the passageways enabling the propagation of a flame front with respect to the number of passageways not enabling the propagation of the flame front must be such that in operation of the engine on high load, a differential pressure is maintained between the precombustion chamber of the igniter and the main combustion chamber which prevents the propagation of a flame front of the precombustion chamber to the main chamber.

The passageways may be arranged as described in the patent application FR 2.810.692.

The precombustion chamber body may be made in any appropriate material, such as Steel 35 CD4, Inconel, Brass, etc.

In a particular embodiment, the precombustion chamber body is made of a metal alloy having a thermal conductivity at 20° C. greater than 10 W/K/m, preferably greater than 30 W/K/m, and liable to reach 350 W/K/m, in particular a copper alloy. An appropriate alloy of high thermal conductivity is the alloy CuCr1Zr whereof the thermal conductivity at 20° C. is 320 W/K/m. These alloys of high thermal conductivity are particularly suited to igniters with precombustion chamber intended for usage with heavily supercharged internal combustion engines, i.e. having an average effective pressure $\geq$ 13 bars.

In another embodiment, the internal wall of the body of the precombustion chamber and/or the external wall of the head of the precombustion chamber body, as well as, possibly, the walls of the passageways, are coated with a refractory coating layer, such as coating layers of $Al_2O_3$, ZrY (not necessarily stoichiometric) and $TiB_2$. The thickness of these coating layers is generally comprised between 0.5 and 100 μm, preferably 1 to 50 μm.

The combustion efficiency is thus increased in the precombustion chamber and the low load operation is improved, in particular in the case of heavily supercharged engines.

The invention also concerns an ignition method of an internal combustion engine wherein:
a main combustible mixture is introduced in a main chamber and a combustible mixture in a precombustion chamber communicating with the main chamber through at least one passageway enabling the propagation of a flame front and at least one passageway not enabling the propagation of a flame front;
the combustible mixture contained in the precombustion chamber is burnt; and
a) for low load operation of the engine:
at least one flame front of the precombustion chamber is let through to the main chamber via the passageway enabling the propagation of a flame front and the main combustible mixture is ignited via the flame front;
b) for high load operation of the engine
unstable compounds are let through from the combustion of the combustible mixture of the precombustion chamber while preventing any propagation of a flame front, of the precombustion chamber to the main chamber, via the passageways, and mass self-ignition of the main combustible mixture seeded with the unstable compounds is caused in the main chamber.

The invention still concerns an igniter for internal combustion engine comprising a precombustion chamber defined by a precombustion chamber body having a head fitted with passageways, the precombustion chamber being intended for containing a combustible mixture, and an ignition system of the combustible mixture contained in the precombustion chamber, characterised in that the precombustion chamber head comprises at least one passageway having a diameter greater than 1 mm up to 3 mm, preferably up to 1.5 mm, and at least one passageway having a diameter equal to or smaller than 1 mm, preferably from 0.5 to 1 mm.

The number of passageways of diameter greater than 1 mm varies generally from 1 to 5 and is preferably 1, and the number of passageway of diameter equal to or smaller than 1 mm is generally from 3 to 20, preferably 3 to 15.

Figure 3B:
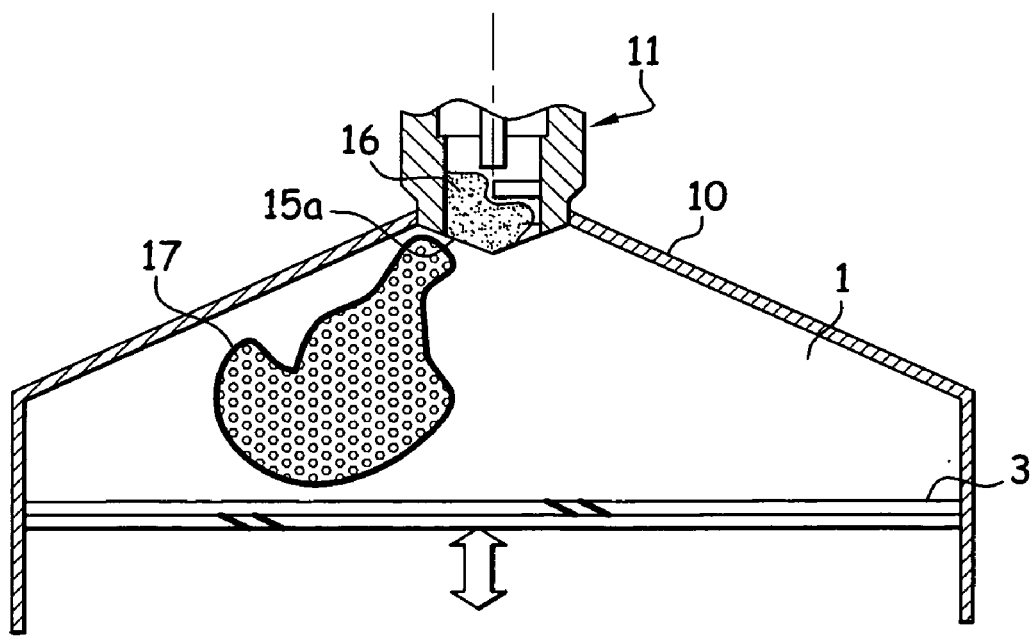
Figure 4A:
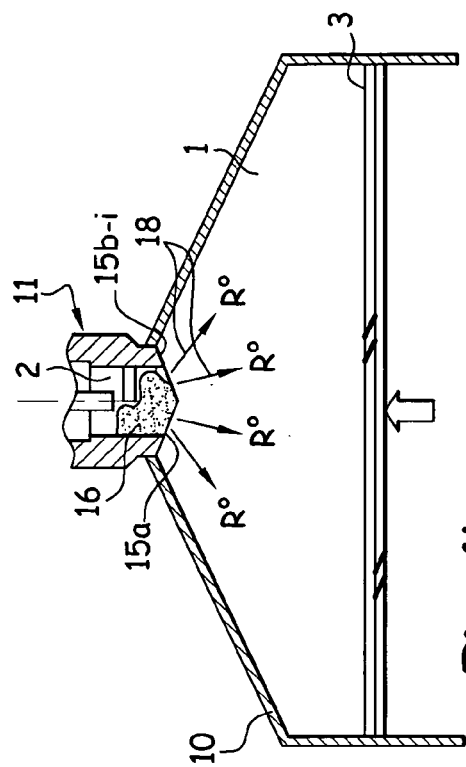
Figure 4B:
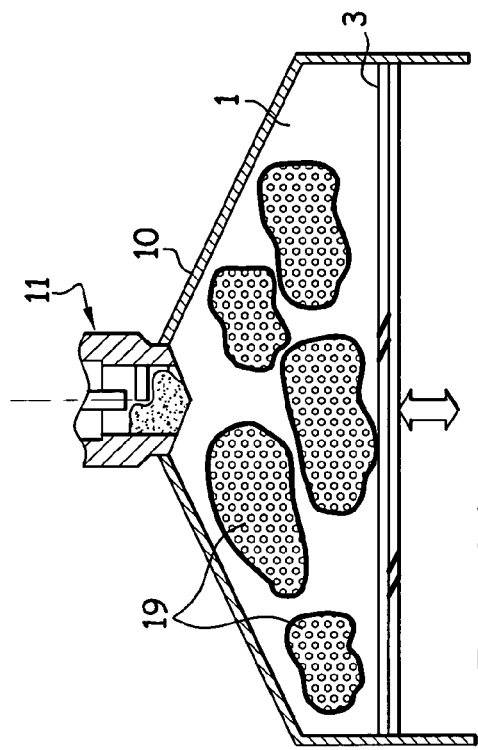
Figure 4C:
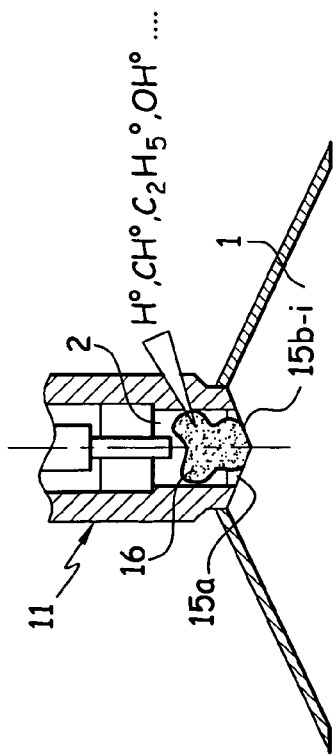
Figure 4D:
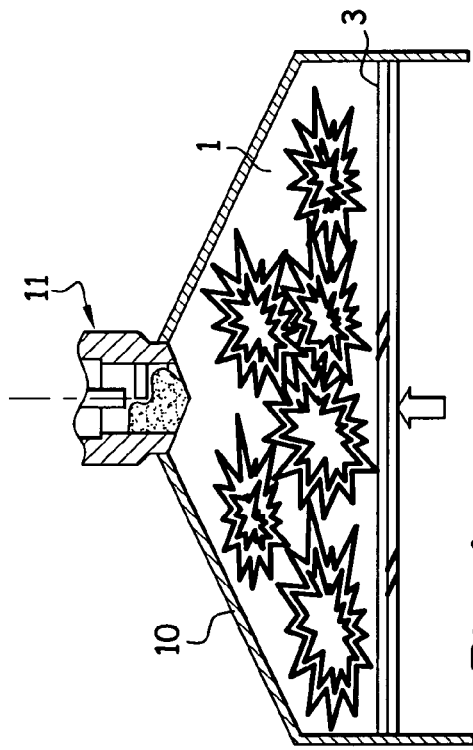

The remainder of the description refers to the appended Figures which represent, respectively:

FIG. 1, a partially sectional schematic view, of an ignition device including an igniter with precombustion chamber according to the invention;

FIG. 2, a view from beneath of the head of a precombustion chamber body of an igniter according to the invention;

FIGS. 3a and 3b, schematic views illustrating the ignition of the main combustible mixture by propagation of a flame front during the operation of the engine on low load; and FIGS. 4a to 4d, schematic views illustrating the self-ignition of the main combustible mixture by seeding with unstable compounds during an operation of the engine on high load.

A cylinder of an internal combustion engine, represented on FIG. 1, includes a main chamber 1 delimited by a sleeve (not represented) and closed at the top by a cylinder head 10. As usual, the main chamber 1 contains a piston (not represented) actuated in translation by a rod (not represented).

An igniter with precombustion chamber 11 according to the invention is installed, in the cylinder head 10 adjoining the main chamber 1, for instance by screwing in a tapping 10a of the cylinder head 10.

The igniter 11 includes a precombustion chamber body 12, generally tubular in shape, comprising a head 12a generally convex in shape, preferably having the form of a spherical cap, delimited a precombustion chamber 2.

The head 12a of the precombustion chamber body 12 forms a separation wall between the main combustion chamber 1 and the precombustion chamber 2.

The volume of the precombustion chamber may range between 200 and 2000 $mm^3$ and ranges preferably between 500 and 1500 $mm^3$.

Typically, the precombustion chamber 2 has a volume smaller than 1.5 $cm^3$, generally ranging between 0.5 $cm^3$ and 1.5 $cm^3$. Generally, the ratio between the volume of the precombustion chamber 2 and the dead volume of the main chamber 1 varies between 0.1 and 5%, preferably between 0.1 and 2%.

Optionally, the igniter 11 may moreover include an inlet (not represented) enabling to supply the precombustion chamber 2 with a combustible mixture formed upstream or to introduce the fuel, the air being mixed with the fuel in the precombustion chamber 2.

The precombustion chamber 2 is fitted with an ignition system comprising a central electrode 13 and a ground electrode 14.

The head 12a forming the separation wall between the main chamber 1 and the precombustion chamber 2, for instance having the form of a spherical cap, is provided with different passageways 15, represented in more details on FIG. 2.

The passageways 15, generally cylindrical in shape, comprise a passageway 15a, having a large diameter greater than 1 mm, generally ranging between more than 1 mm and 3 mm and a series of passageways 15b to 15i (7 in the embodiment of FIG. 2) having a small diameter$\leq$1 mm. Generally, the length of the passageways is smaller than 1 mm and they are preferably oriented according to radii of the hemispherical head 12a.

constant S/V ratio, the optimisation of the number of conduits and of the diameter (smaller than 1 mm) is realised in order to obtain as high a ratio as possible between small diameter conduits/large diameter conduit section.

The following table shows for three cases of volume of precombustion chamber (400, 750, 1500 mm$^3$), (400 and 1500 mm$^3$) with the lower and upper preferred values, the preferred arrangements of the conduits in terms of quantity for the categories of diameter<=1 mm diameter>1 mm. The different examples of distributions of diameters and numbers of conduits are given at identical S/V ratio in order to have identical combustion dynamics in the precombustion chamber for the different cases mentioned.

TABLE

Presentation of the preferred configurations for sizing the conduits with S/V iso-ratio for different cases of volume

| N° case | 1 | 2 | 3 | 4 | 5 | 6 | 7 | 8 | 9 |
|---|---|---|---|---|---|---|---|---|---|
| Volume (mm3) | 400 | 400 | 750 | 750 | 750 | 1500 | 1500 | 1500 | 1500 |
| diameter n° 1 | 0.9 | 0.6 | 0.9 | 0.9 | 0.8 | 0.9 | 0.9 | 0.6 | 0.8 |
| number n° 1 | 4 | 3 | 8 | 3 | 7 | 16 | 5 | 14 | 15 |
| diameter n° 2 | 0 | 1.5 | 0 | 2 | 1.4 | 0 | 3 | 2 | 2 |
| number n° 2 | 0 | 1 | 0 | 1 | 1 | 0 | 1 | 2 | 1 |
| Number of conduits | 4 | 4 | 8 | 4 | 8 | 16 | 6 | 16 | 16 |
| section n° 1 | 2.5 | 0.8 | 5.1 | 1.9 | 3.5 | 10.2 | 3.2 | 4.0 | 7.5 |
| section n° 2 | 0.0 | 1.8 | 0.0 | 3.1 | 1.8 | 0.0 | 7.1 | 6.3 | 3.1 |
| section (mm2) | 2.5 | 2.6 | 5.1 | 5.1 | 5.3 | 10.2 | 10.2 | 10.2 | 10.7 |
| S/V ratio (mm−1) (10$^{-3}$) | 6.4 | 6.5 | 6.8 | 6.7 | 6.7 | 6.8 | 6.8 | 6.8 | 7.1 |
| Preferred (by order of preference) | 2 | 1 | 3 | 2 | 1 | 3 | 2 | 2 | 1 |

Although a single passageway 15a of diameter greater than 1 mm (preferred embodiment) has been represented, the head 12a may include several passageways of large diameter, but in such a case, as will be detailed below, the number and the dimension of these passageways of large diameter must be such that generally no flame front may propagate from the precombustion chamber 2 to the main chamber 1 when the engine operates on high load, i.e. from a quarter of the maximum load up to the maximum load.

It should be understood that within the framework of the invention, taking into account the repetitive character of the operation of an engine and that its operating parameters may not all be controlled with absolute precision, the fact that the device should prevent the propagation of a flame front on high load is a statistical notion. Generally, it will prevent it, but it may happen, rarely, randomly or under certain very specific conditions, that, even on high load a flame front may be let through. However, as a rule, the device is set up so that under high load operation, it is preferable not to have any ignitions by propagation of a flame front, but rather by unstable species. The multi-site initiation by seeding with unstable species has been demonstrated as ensuring a faster combustion speed than the propagation of a single flame front and in this sense, shows greater potential for inhibiting the pinking phenomenon. Preferably, a conduit of diameter greater than 1 mm is sufficient to ensure the ignition by propagation of flame fronts on low load. The flame skewing at the conduits is conditioned by the differential pressure between the precombustion chamber—combustion chamber. For an identical volume, the pressure rise dynamics in the precombustion chamber is conditioned at the order 1 by the efficient combustion section between the precombustion chamber and the main chamber.

As stated above, preferably the number of conduits of diameter smaller than 1 mm is greater than the number of conduits of diameter greater than 1 mm. Generally with Comments/Different Cases:
1. initial case V=400 mm$^3$: no conduit smaller than 1 mm (no flame propagation)
2. optimised case for V=400 mm$^3$: number of conduits identical to the initial case, distribution of efficient section of conduits with small diameter/conduits with large diameters (30%, 70%), detrimental distribution at uniform seeding at high load.
3. initial case V=750 mm$^3$: no conduit smaller than 1 mm (no flame propagation)
4. a conduit of diameter 2 mm, detrimental case un terms of uniformed seeding with unstable species at high load since the number of conduits is vastly smaller than the initial case
5. optimised case for V=750 mm$^3$: number of conduits identical to the initial case, a conduit>1 mm, distribution of efficient section of conduits with small diameter/ conduits with large diameters (66%, 34%), evolution of the diameter<1 mm from 0.9 to 0.8 mm.

We shall now describe the operation of the igniter and of the ignition device according to the invention in connection with FIGS. 3a and 3b (low load) and 4a to 4d (high load).

As indicated previously when using an igniter with precombustion chamber with only passageways of small diameter (0.9 mm), one has noted unstable combustions for low load operation of the engine, in particular in idle mode. One has determined that this problem was due to pressure and temperature levels reached during the engine compression phase which are insufficient to enable self-ignition in the main chamber seeded with unstable compounds.

The igniter according to the invention remedies this shortcoming.

Owing to the small quantity of air/fuel mixture in the precombustion chamber 2 in the case of small loads, the pressure rise in the precombustion chamber is significantly less violent than in the case high loads and the flame front 16 obtained by the combustion of the mixture in the precombustion chamber 2 may, thanks to the passageway of large diameter 15a propagate in the main chamber 1 and create a combustion pocket 17 therein.

This continuous propagation of the flame front between precombustion chamber 2 and main chamber 1 ensures a stability on low load similar to the conventional case of the ignition controlled engines.

In the case of high loads, the quantity of mixture carburized in the precombustion chamber 2 is from 3 to 7 times greater than the case with small loads.

During the combustion of the mixture in the precombustion chamber, the pressure rise is significantly greater. The differential pressure between the precombustion chamber 2 and the main chamber 1 prevents the propagation of the flame front 16 from the precombustion chamber 2 to the main chamber 1.

Nevertheless, the passageways 15a to 15i let through the flux 18 of unstable compounds from the precombustion chamber 2 to the main chamber 1.

As the piston 3 goes up again, the compression generates mass self-ignition of the main mixture, in the form of combustion pockets 19.

The invention claimed is:

1. An ignition device for internal combustion engine comprising:
    a main chamber intended for containing a main combustible mixture and fitted with a compression system of said mixture; and
    an igniter comprising a precombustion chamber intended for containing a combustible mixture and an ignition system of the combustible mixture contained in the precombustion chamber, the precombustion chamber being defined by a precombustion chamber body having a head including passageways, the head of the pre-heating body separating the precombustion chamber from the main chamber and communicating the precombustion chamber and to main chamber through the passageways, wherein the passageways comprise at least one passageway enabling the propagation of a flame front from the precombustion chamber to the main chamber when the engine operates on low load and at least one passageway not enabling the propagation of a front flame from the precombustion chamber to the main chamber while enabling the passageway of the precombustion chamber to the main chamber of unstable compounds derived from the combustion of the combustible mixture in the precombustion chamber.

2. A device according to claim 1, wherein the number of passageways enabling the propagation of a flame front provided in the head of the precombustion chamber body is 1 to 5.

3. A device according to claim 1, wherein the number of passageways not enabling the propagation of a flame front is 1 to 20.

4. A device according to claim 1, wherein the passageway(s) enabling the propagation of a flame front have a diameter greater than 1 mm up to 3 mm.

5. A device according to claim 1, wherein the passageways not enabling the propagation of a flame front have a diameter $\leq$ 1 mm.

6. A device according to claim 1, wherein the head of the precombustion chamber body has the shape of a spherical cap.

7. A device according to claim 6, wherein the passageways are oriented following radii of the spherical cap.

8. A device according to claim 1, wherein the precombustion chamber body is a metal alloy having a thermal conductivity at 20° C. of at least 10 W/K/m.

9. A device according to claim 8, wherein the alloy is a copper alloy.

10. A device according to claim 9, wherein the alloy is the alloy Cu Cr 1 Zr.

11. A device according to claim 1, wherein the internal wall of the precombustion chamber body and/or the external wall of the bead of the precombustion chamber body and/or the walls of the passageways are coated with a refractory coating layer.

12. A device according to claim 11, wherein the refractory coating layer is selected among: $Al_2O_3$, ZrY and $TiB_2$.

13. A device according to claim 11, wherein the refractory coating layer has a thickness of 0.5 to 100 μm.

14. A device according to claim 2, wherein the number of passageways enabling the propagation of a flame front provided in the head of the precombustion chamber body is 1.

15. A device according to claim 3, wherein the number of passageways not enabling the propagation of a flame front is 3 to 15.

16. A device according to claim 4, wherein the passageway(s) enabling the propagation of a flame front have a diameter greater than 1 mm up to 1.5 mm.

17. A device according to claim 5, wherein the passageways not enabling the propagation of a flame front have a diameter 0.5 to 1 mm.

18. A device according to claim 8, wherein the precombustion chamber body is a metal alloy having a thermal conductivity at 20° C. of at least 30 W/K/m.

19. A device according to claim 13, wherein the refractory coating layer has a thickness of 1 to 50 μm.

20. A method for igniting an internal combustion engine wherein:
    a main combustible mixture is introduced into a main chamber and a combustible mixture in a precombustion chamber communicating with the main chamber through at least one passageway enabling the propagation of a flame front and at least one passageway not enabling the propagation of a flame front;
    the combustible mixture contained in the precombustion chamber is burnt and
    a) for low load operation of the engine:
        at least one flame front is let through from the precombustion chamber to the main chamber via the passageway enabling the propagation of a flame front and the main combustible mixture is ignited via the flame front;
    b) for high load operation of the engine;
        unstable compounds from the combustion of the combustible mixture from the precombustion chamber while preventing any propagation of a flame front, are passed from the precombustion chamber to the main chamber, via the passageways, and the main combustible mixture seeded with the unstable compounds undergoes mass self ignition in the main chamber.

21. An igniter for combustion engine comprising a precombustion chamber defined by a precombustion chamber body having a head fitted with passageways, the precombustion chamber being intended for containing a combustible mixture, and an ignition system of the combustible mixture contained in the precombustion chamber, wherein the precombustion chamber head comprises at least one passageway having a diameter greater than 1 mm up to 3 mm, and at least one passageway having a diameter equal to or smaller than 1 mm.

22. An igniter according to claim 21, wherein the precombustion chamber head comprises 1 to 5 passageways of diameter greater than 1 mm.

23. An igniter according to claim 21, wherein the precombustion chamber head comprises 1 to 20 passageways of diameter smaller than or equal to 1 mm.

24. An igniter according to claim 21, wherein the precombustion chamber head is a spherical cap.

25. An igniter according to claim 24, wherein the passageways are oriented following radii of the spherical cap.

26. An igniter according to claim 21, wherein the precombustion chamber head comprises at least one passageway having a diameter greater than 1 mm up to 1.5 mm, and at least one passageway having a diameter 0.5 to 1 mm.

27. An igniter according to claim 22, wherein the precombustion chamber head comprises 1 passageway of diameter greater than 1 mm.

28. An igniter according to claim 23, wherein the precombustion chamber head comprises 3 to 15 passageways of diameter smaller than or equal to 1 mm.

* * * * *